United States Patent Office 3,377,193
Patented Apr. 9, 1968

3,377,193
CORROSION-RESISTANT COATING COMPOSITION OF ZINC AND FLUOROCARBON RESIN AND FERROUS METAL ARTICLE COATED THEREWITH
Frederic B. Stilmar, Wilmington, Del., assignor to E. I. du Pont de Nemours and Company, Wilmington, Del., a corporation of Delaware
No Drawing. Filed Dec. 10, 1964, Ser. No. 417,491
10 Claims. (Cl. 117—75)

The present invention is directed to a new anticorrosion coating material for ferrous metal.

Ferrous metals are subject to attack by numerous corrosive agent. Accordingly, ferrous metal surfaces are normally painted in order to protect the metal against destruction by corrosive attack. Besides protecting the ferrous metal, painting also serves as a means for enhancing the aesthetic appearance of the metal substrate.

A time-honored procedure for protecting ferrous metals from corrosive attack or deterioation is to apply a thin layer of zinc metal on the ferrous metal substrate. A variety of procedures have been devices for applying this thin layer of zinc to the metal substrate. Examples of such procedures are galvanizing, electrodeposition, zinc spray, and zinc dust paint. Recently, the method using the zinc dust pain has become particularly important because of the ease and convenience of application.

The use of zinc dust in paints has been known since the middle of the last century. Commonly used binders in zinc paints are chlorinated and cyclized rubber, polystyrene, epoxy resins and organic and inorganic silicates. Coatings on ferrous metal substrates prepared from these known zinc dust-containing paints, however, are subject to either or both of two major deficiences, namely, poor resistance to impact, specifically caracteristic of the silicate-bonded zinc dust paints, and deterioration when exposed to the weather, particularly notable in zinc dust paints bonded by an organic polymer such as chlorinated rubber or polystyrene. Thus, the zinc-containing paints commercially available deteriorate when they are part of a structure exposed out of doors to weather and ordinary use conditions.

It is, therefore, an object of this invention to provide novel coating compositions for ferrous metal substrates which will protect the substrate from corrosive attack during extended periods of ordinary use and exposure to weather.

It is another object of this invention to provide novel coating compositions for ferrous metal substrates which, in addition to protecting the substrate, will enhance the aesthetic appearance of the metal substrate and protect the enhanced appearance during extended periods of exposure to outdoor weather conditions.

These and other objects will become apparent from the following description and claims.

More specifically, the above objects are accomplished by the present invention which is directed to a coating composition for ferrous metals comprising from about 20% to about 90% by volume of finely divided zinc metal dispersed in a fluorocarbon polymer, said polymer having a fluorine content of at least 30% by weight, a sticking temperature greater than 60° C., a glass transition temperature of less than 105° C., and a melt flow rate of greater than 0.5 g./10 minutes at 195° C.

The present invention is also directed to ferrous metal substrates coated with the above-defined compositions.

The novel coatings of this invention consist of two essential components. They are (1) finely divided zinc metal, and (2) a normally solid polymer of a terminally unsaturated fluorine-containing olefin. Optionally, the coatings may include certain essentially inert materials such as pigments, fillers, dyes or antioxidants.

To provide the combination of corrision resistance and impact resistance of the invention coatings, it is essential that the finely divided zinc metal be present in a concentration of from about 20% to about 90% by volume. If lesser amounts of the zinc are present, the coatings do not provide the desired corrosion-resistant protection for ferrous metal substrates. If greater than about 90 volume percent of zinc is incorporated into the coating composition, the coating has reduced resistance to impact and the quantity of binder may be insufficient to secure the zinc within the composition.

The coating compositions of the present invention are particularly useful for the prevention of corrosion of ferrous metal substrates. These substrates include those made of iron or iron alloys including steel, cast irons and wrought irons which under normal use conditions in the atmosphere undergo corrosion, particularly rusting. These substrates may take a variety of forms, such as sheet, wire and machined, cast or otherwise formed bulk articles. Ferrous metal articles, having been coated with fluorocarbon-zinc compositions of the present invention, are useful as components in ships, marine structures, industrial buildings, bridges, vehicles, and wherever else durable corrosion-resistant ferrous metal structures are used. Since it is often desired to protect only a portion of ferrous metal substrates, it is fully contemplated that the ferrous metal articles of this invention may be only partially coated with the zinc-fluorine-containing polymer coating.

The powdered zinc metal should be of a pigment grade. The exact particle size of the zinc powder is not critical and may range from about 2 to about 60 microns. It has been generally observed, however, that best anticorrosion protection is obtained with particles having a size no greater than 8 microns. Experience has indicated that freedom from oversize particles is an important factor and no more than a trace of zinc particles should be retained on a 300-mesh sieve since any large, hard particles would form areas of weakness in the coating. Experience has also shown that the zinc should be essentially neutral and contain a minimum content of the oxide. Alloys of zinc with such other metals as aluminum or magnesium are also useful; however, essentially pure zinc is preferred. It is also preferred that the zinc be uniformly dispersed in the polymer.

It is essential, of course, for best protection that the ferrous metal substrate to which the zinc-containing fluorocarbon coating composition is applied be free from grease, scale, rust or other foreign matter. Suitable methods for providing such clean surfaces include blasting with a suitable abrasive, vapor degreasing with a substance such as trichloroethylene, rubbing with abrasive paper, wire brushing and pickling.

The polymers of terminally unsaturated fluorine-containing olefins used as the binder component in the coating compositions of the present invention are normally solid polymers characterized by a fluorine content greater than 30% by weight, a sticking temperature greater than 60° C., a second order transition (glass transition temperature, $T_g$) of less than about 105° C., and a melt flow rate of the polymer itself or of the polymer in admixture with an equal weight of latent solvent of greater than 0.5 g./10 minutes at 195° C. These polymers include homopolymers and copolymers of at least one polymerizable fluorine-containing olefin. Fluorocarbon polymers containing less than 30% by weight fluorine do not provide, in combination with the zinc, the durable corrosion resistance and impact resistance when subjected to atmospheric weathering. The fluorocarbon polymers must also possess a sticking temperature greater than 60° C. to be useful when exposed under tropical or desert conditions.

"Sticking temperature" can be defined as the lowest temperature of a heated brass block at which a solid polymer leaves a molten trail when moved across the brass block.

Those fluorocarbon polymers having a glass transition or second order transition temperature greater than 105° C., such as polytetrafluoroethylene, are not useful in the coating compositions of this invention since they do not possess satisfactory film-forming properties. The phenomena known as "glass transition" or "second order transition" and the methods of measuring the glass transition temperature of polymeric materials is fully discussed in Textbook of Polymer Science, Billmeyer, Fred W., Interscience Publishers (1962), p. 198 et seq. The polymer binder must also possess a melt flow rate at 195° C. of greater than 0.5 g./10 minutes. For the purposes of this invention, "melt flow rate" is defined as the weight of molten polymer in grams that passes through a defined orifice in 10 minutes at an indicated temperature and under a specified extrusion weight. Also, the polymers must possess the required flow rate at this temperature either by themselves or in admixture with an equal weight of latent solvent. Latent solvents which are particularly useful are dimethyl phthalate, diethyl adipate, diisobutyl phthalate, diethyl succinate, tetraethyl urea, triethyl phosphate, and di(2-ethylhexyl) phthalate. This required melt flow rate is necessary if the polymer is to form continuous, coalesced, adherent coatings. The melt flow rate of the polymers of this invention was measured by ASTM Method D–1238–62T at 195° C. with a weight of 2160 grams and an orifice of 0.082 inch diameter and 0.319 inch length.

Representative examples of fluorinated polymerizable olefins useful for the formation of the film-forming fluorocarbon polymers of this invention are vinyl fluoride,
vinylidene fluoride,
trifluoroethylene,
tetrafluoroethylene,
chlorotrifluoroethylene,
hexafluoropropylene,
dichlorodifluoropropylene,
dichlorodifluoroethylene and tetrafluoropropylene.

Of these, vinyl fluoride, vinylidene fluoride and tetrafluoroethylene are preferred. Specific homopolymers include polyvinyl fluoride, polyvinylidene fluoride, and polychlorotrifluoroethylene.
Copolymers include tetrafluoroethylene/vinyl acetate,
vinylidene fluoride/isobutylene,
vinyl fluoride/isobutylene,
vinylidene fluoride/chlorotrifluoroethylene,
tetrafluoroethylene/hexafluoropropylene,
vinylidene fluoride/tetrafluoroethylene,
vinyl fluoride/vinylidene fluoride/vinyl acetate,
vinylidene fluoride/tetrafluoroethylene/t-butyl methacrylate,
tetrafluoroethylene/chlorotrifluoroethylene/methacrylic acid,
vinylidene fluoride/tetrafluoroethylene/bis(2-chloroethyl) vinylphosphonate,
vinyl fluoride/trifluoroethylene,
tetrafluoroethylene/isobutylene,
tetrafluoroethylene/isobutylene/vinyl benzoate,
tetrafluoroethylene/isobutylene/vinyl benzoate/itaconic acid,
tetrafluoroethylene/ethylene/vinyl benzoate/bis(2-chloroethyl) vinylphosphonate,
vinylidene fluoride/tetrafluoroethylene/vinyl acetate,
vinylidene fluoride/tetrafluoroethylene/acrylic acid,
vinylidene fluoride/tetrafluoroethylene/vinyl butyrate/dineopentyl vinylphosphonate, and various other copolymers, particularly those more fully described in U.S.P. 2,419,009; 2,468,054; 2,468,664, and 2,599,640 and in my copending applications S.N. 286,470, filed June 10, 1963, now U.S. Patent No. 3,318,-850; S.N. 407,868, filed Oct. 30, 1964; S.N. 407,856, filed Oct. 30, 1964, and S.N. 407,858, filed Oct. 30, 1964. Other examples of fluorine-containing copolymers which are useful in the present coating are described in pending application S.N. 407,860, filed Oct. 30, 1964.

The fluorine-containing copolymers particularly preferred because of their excellent adhesion capability, especially with the ferrous metal substrates, are those wherein chain units are derived from an olefinically unsaturated polymerizable acid having an acidity constant (pKa) of from 1.0 to 5.5 or a derivative thereof which hydrolyzes to the free acid. More specifically, a preferred class of the fluorocarbon polymer-zinc coating compositions are those coatings wherein the fluorocarbon polymer binders are formed by polymerizing at least one terminally unsaturated fluorine-containing olefin and at least one acid monomer such as (A) the ethylenically unsaturated mono- and dicarboxylic acids having from three to eleven carbon atoms, (B) the lower alkyl mono- and diesters, the salts, and the anhydrides of such carboxylic acids, (C) the ethylenically unsaturated phosphonic acids having up to eighteen carbon atoms, and (D) the lower alkyl mono- and diesters, the salts, and the anhydrides of such phosphonic acids. Specific representative examples of such acid monomers include unsaturated carboxylic acids such as acrylic, methacrylic, maleic, fumaric, crotonic, itaconic, undecylenic, 3-methylene cyclobutane carboxylic acids, and similar polymerizable aliphatic carboxylic acids. Specific representative examples of phosphonic acid monomers are the alkenephosphonic acids, such as vinylphosphonic acid, allylphosphonic acid, butenylphosphonic acid, and 17-octadecenephosphonic acid. In place of the free acids one may use derivatives of the acids which are hydrolyzable to the free acid such as the lower alkyl or haloalkyl esters, the salts, and the anhydrides of the acids. Representative examples of such esters of the above acids include the various isomeric methyl, ethyl, propyl, butyl, amyl and hexyl mono- and diesters. The sodium and potassium salts of the above acids are the preferred salt derivatives. In order to recognize this improved adhesion, the fluorocarbon copolymer must contain the polymerizable acid monomer in an amount of at least about 0.01% by weight.

An even more preferred class of fluorocarbon copolymer-zinc-containing coatings is that wherein the fluorocarbon polymer binders are formed by polymerizing four monomer components. They are (1) a terminally unsaturated fluorine-containing olefin, (2) a $C_2$ to $C_4$ terminally unsaturated hydrocarbon olefin and/or a $C_2$ to $C_4$ unsaturated fluorine-containing olefin different from (1) above, (3) a vinyl ester of an alkane carboxylic acid of from 2 to 10 carbon atoms, and (4) an acid monomer as described above.

It is to be understood, of course, that the copolymers containing the acid monomer and hydrocarbon olefin must also possess the physical characteristics heretofore defined. Thus, the fluorocarbon copolymers containing the acid monomer must also have a fluorine content greater than 30% by weight, a sticking temperature greater than 60 C., a glass transition temperature of less than about 105° C. and a melt flow rate of greater than 0.5 g./10 minutes at 195° C.

The polymers of the invention are made by conventional methods well known to those skilled in the art. In one convenient method, the monomers to be polymerized and an initiator, usually in the presence of an inert liquid medium, are heated in a closed container under moderate superatmospheric pressures, e.g., about 300 to 2500 p.s.i. (ca. 20 to 170 atmospheres).

Conventional free radical initiators, such as peroxides, azonitriles and metal and ammonium persulfates, can be used as initiators. Organic-soluble initiators (i.e., initially soluble in typical organic solvents) are preferred, particularly organic peroxides such as benzoyl peroxide, tert.-butyl peroxypivalate, and tert.-butyl peroxide. The temperature of reaction will, of course, be determined largely by the particular initiator used. Water, lower alkanols, and lower carboxamides such as dimethylacetamide, together with mixtures thereof, can be used as inert reaction media. Inert organic media, while more costly than water, have the advantage that copolymers prepared in their presence show less tendency to appear as hard lumps in the product mixture and are correspondingly easier to work up.

The zinc-polymer coating compositions of this invention can be applied to the ferrous metal substrates by a variety of methods. Suitable methods include application from a dispersion of the finely divided zinc metal in solution, such as in an organosol, or in an aqueous dispersion of the polymer. Essentially dry mixtures of the zinc and fluorocarbon polymer can be applied to the substrate by melt coating, for example, by melt extrusion or by flame spraying. The particular method used for application of the coating depends primarily on the nature and the properties of the particular fluorocarbon polymer being used. Thus, coatings comprising tetrafluoroethylene/ethylene copolymers or polyvinylidene fluoride or polyvinyl fluoride are best laid down from organosols. Zinc-polymer compositions wherein the polymer is a tetrafluoroethylene/isobutylene or a tetrafluoroethylene/ethylene copolymer are also applied by melt techniques such as melt extrusion or flame spraying. The compositions comprising ter-, tetra- and multicomponent fluorocarbon copolymers are usually best applied from solution. With tetrafluoroethylene/hexafluoropropylene copolymer an aqueous dispersion is the preferred method of application.

Those fluorocarbon polymers which are soluble and can be applied from solution are particularly preferred. These solutions are readily mixed with zinc dust and the resulting compositions are easily applied to ferrous metal substrates. The particular solvents used are dependent on the composition of the polymers. For example, xylene, toluene, trichloroethylene and 1,1,2,2-tetrafluoro-1,3,3,3-tetrachloropropane or combinations of these solvents with each other or with common hydrocarbon, chlorocarbon, ester, or ketonic solvents are preferred for the copolymers containing both tetrafluoroethylene and isobutylene as principal monomers. For the copolymers containing vinylidene fluoride and tetrafluoroethylene as principal monomers, such solvents as cyclohexanone, methyl ethyl ketone, N,N-dimethylformamide, N,N-dimethylacetamide, and mixed solvents incorporating these materials are preferred.

It is often desirable to heat treat the coated ferrous metal substrate in order to assure maximum adhesion. The temperature required to insure this adhesion and completely coalesce the fluorocarbon polymer-zinc coating varies with the nature of the fluorocarbon copolymer. However, suitable temperatures can be usually found within the range of 50 to 300° C. Application of pressure in conjunction with the heat treatment can also be useful in insuring maximum adhesion of the coating.

As indicated above, essentially inert materials such as pigments, fillers, dyes or antioxidants may be incorporated into the zinc-polymer coatings. This incorporation can be brought about by a variety of well-known methods; however, it is preferred to incorporate these additives into the fluorocarbon polymer prior to the addition of the finely divided zinc. Among the methods that may be used for the incorporation of the additives are ball milling or sand milling of the preformed fluorocarbon polymers with the given additive or additives. The finely divided zinc is usually incorporated into the fluorocarbon-containing composition by simple mechanical mixing such as stirring, tumbling or other means of agitation. Since there is a tendency for the zinc to settle out on standing, it is preferred to mix the coating composition thoroughly just prior to or during application of the coating to a substrate.

It is, of course, often desired to apply the coating composition in two layers or by two separate applications. For instance, it is often desirable to apply a layer of the fluorocarbon polymer-zinc coating to the ferrous metal substrate first and then apply a second layer of the fluorocarbon polymer or a layer of the fluorocarbon polymer containing other inert materials, such as pigments and antioxidants. Such products are also intended as a part of this invention.

Representative examples of the present invention follow. All parts are by weight unless otherwise specified.

The superiority of the compositions of this invention to all prior art compositions is shown by a variety of tests. Exposure out of doors to a variety of weathering conditions is, of course, the best ultimate test of the durability of the present coating compositions. Such exposures under simulated use conditions in a corrosive environment give a measure of the compositions' usefullness. Accelerated tests simulating actual use conditions are also of value. Both types of tests were employed in the following examples. Thus, articles coated with the compositions of this invention have been exposed out of doors under the corrosion-promoting atmosphere of a chemical plant for an extened period of time and have been placed for extended periods of time in boiling water or in aerated 5% sodium chloride solution. Under each of these test conditions, the invention coatings were superior in corrosion resistance, weather resistance and in over-all impact resistance to other zinc-containing paints.

EXAMPLE 1

A series of zinc-filled fluorocarbon polymer coatings on steel was examined for corrosion-protection ability at different levels of zinc content. The fluorocarbon polymers used and their properties are summarized below in Table I.

TABLE I.—FLUOROCARBON POLYMERS

| Polymer Designation | Polymer Composition | Polymer Properties | | | | |
|---|---|---|---|---|---|---|
| | | Parts by Wt. Monomers | $T_g$., ° C. | Sticking Temp., ° C. | Percent F | Melt Flow Rate g./10 min. at 195° C. |
| I | Polyvinylidene Fluoride | 100 | −35 | 172 | 59.4 | [1] 26 |
| II | Tetrafluoroethylene/isobutylene copolymer | 100/56 | 33 | 154 | 47.3 | [2] 138 |
| III | Tetrafluoroethylene/vinylidene fluoride/vinyl butyrate/bis(2-chloroethyl) vinylphosphonate copolymer. | 40/160/6/1 | <40 | 67 | 55.0 | 12.6 |
| IV | Tetrafluoroethylene/isobutylene/vinyl benzoate/vinyl α,α-di-ethyloctanoate/itaconic acid. | 150/60/70/28/1 | 42 | 87 | 37.9 | 10.5 |

[1] Melt flow rate of polyvinylidene fluoride mixed with an equal weight of dimethyl phthalate as latent solvent.
[2] Melt flow rate of tetrafluoroethylene/isobutylene copolymer mixed with 85% of its weight of dimethyl phthalate as latent solvent.

Each polymer was mixed with a pigment grade powdered zinc at different levels of concentration to give polymer-zinc compositions containing 0, 10, 30, 50, 70 and 90% by volume of zinc. The compositions were applied by appropriate coating methods to freshly sandblasted 20 gauge automotive steel. The coating thicknesses ranged from 1 to 5 mils.

Zinc-Polymer I formulations were prepared from the powdered zinc and an organosol composition containing 32% by weight of Polymer I in a mixture of about 66 parts γ-butyrolactone, 32 parts methyl ethyl ketone and 2 parts toluene. After coating the steel with the zinc-Polymer I formulation the coating was baked at 195° C. for 90 minutes.

The zinc-Polymer II mixtures were dispersed in xylene, applied to the steel by brush and the xylene evaporated. The coating mixture on the steel was then heated on a hot plate at 350 to 380° C. and spread with a spatula to form a continuous, uniform coating over the steel.

The zinc-Polymer III formulations were prepared from powdered zinc and a solution of the polymer in cyclohexanone. These formulations were applied to the steel by brush application and gave continuous, uniform coatings on evaporation of the solvent at room temperature.

The zinc-Polymer IV formulations were prepared from powdered zinc and a solution of Polymer IV in xylene. Continuous, uniform coatings of the zinc-Polymer IV composition were prepared by brush application followed by evaporation of the solvent at room temperature.

Each panel was allowed to air dry at room temperature for two weeks before the tests described below were begun. Each panel was cut into two approximately equal portions, and the edges were trimmed to give at least two bare steel edges on each piece. One panel section corresponding to each coating formulation was tested as follows. First, an X cut to bare metal was made through the coatings on one flat side of the panel. After the X cut was made, the panel was turned over and subjected, at a point on the side directly opposite from the X cut, to a 160 inch/pound impact test with a round-nose steel impact rod (Gardner Impact Tester). After the impact, a piece of adhesive tape was pressed directly over the X cut and ripped away to test adhesion of the coating.

The second of each coated panel section was tested as follows. First, an X cut was made through the coating to bare metal on one flat side of the panel. Then, the piece was immersed in 5% aqueous sodium chloride solution which was continuously aerated. Fourteen days later the piece was removed and inspected. The coating was then tested for adhesion with the adhesive tape test described above. After the adhesion test, the piece was subjected to the 160 inch/pound impact test at a point opposite the X cut as described above. The adhesive tape test for adhesion was repeated over the X cut after the impact test.

Based on the above tests, the coatings were rated as follows as to their over-all resistance to corrosive attack (Table II), and on adhesion to the substrate combined with resistance to impact both before and after the corrosion test (Table III).

TABLE II.—CORROSION

| Description: | Rating |
|---|---|
| Essentially no corrosion and no change in appearance | G |
| Slight to moderate corrosion at bare edges and/or X cut | F |
| Extensive failure due to corrosion or appearance change | P |

TABLE III.—ADHESION AND RESISTANCE TO IMPACT

| Description: | Rating |
|---|---|
| No adhesive failure before or after impact | 1 |
| No failure before impact but slight failure after impact | 2 |
| Slight adhesive failure over impact area | 3 |
| Moderate adhesive failure over impact area | 4 |
| Essentially complete loss of adhesion over impact area | 5 |

A tabulation of the ratings achieved by the zinc-polymer coating on the steel panels is summarized in Table IV below.

TABLE IV

| Zinc-Polymer Coating Designation | Percent Zinc in Dry Coating | | Performance Rating | |
|---|---|---|---|---|
| | Percent by vol. | Percent by wt. | Corrosion | Adhesion and Resistance to Impact |
| I | 0 | 0 | P | 2 |
| | 10 | 31 | P | 2 |
| | 30 | 61 | G | 2 |
| | 50 | 80 | G | 2 |
| | 70 | 90 | G | 3 |
| | 90 | 97 | G | 4 |
| II | 0 | 0 | P | 4 |
| | 10 | 34 | P | 3 |
| | 35 | 66 | F | 3 |
| | 50 | 82 | G | 2 |
| III | 0 | 0 | P | 1 |
| | 10 | 31 | P | 1 |
| | 30 | 63 | F | 1 |
| | 43 | 76 | G | 1 |
| | 50 | 80 | G | 1 |
| | 70 | 90 | G | 1 |
| | 90 | 97 | G | 3 |
| IV | 0 | 0 | P | 1 |
| | 10 | 35 | P | 1 |
| | 30 | 67 | P | 1 |
| | 50 | 83 | G | 1 |
| | 70 | 92 | G | 2 |
| | 90 | 98 | G | 3 |

All of the zinc-polymer coatings of this invention were much superior in resistance to impact to zinc-rich coatings having an inorganic silicate binder.

Coatings were also prepared with Polymer III and Polymer IV using powdered aluminum in place of powdered zinc in the above formulations. All of the aluminum-containing coatings gave a rating of P in the corrosion test.

EXAMPLE 2

The zinc-containing coatings of Example 1 having Polymers III and IV as binders and a 50% by volume content of zinc were applied by brush to sandblasted steel panels. After air drying for one day, a topcoat of the following formulation was applied by brush:

Fluorocarbon polymer _____ g-- 25
Solvent _____ ml-- 80
Titanium dioxide pigment _____ g-- 15

The topcoated panels were air dried at room temperature for two weeks prior to testing. The zinc-Polymer III primed panel was topcoated with a composition formulated as above wherein the fluorocarbon polymer was Polymer III and the zinc-Polymer IV primed panel was topcoated with a similar formulated composition wherein the fluorocarbon polymer was Polymer IV. The solvent used with Polymer III was cyclohexanone and that with Polymer IV was xylene. A second series of primed, topcoated panels was prepared using turquoise-colored topcoating formulations of each polymer in which 2.5 g. of the titanium dioxide pigment was replaced by a mixture of 0.5 g. of lampblack pigment and 2.0 g. of "Monastral" Green B pigment C.I. 10006.

Each of the topcoated panels was subjected to the series of tests described in Example 1. Each showed no adhesive failure and each rated G for corrosion resistance and 1 for adhesion and impact resistance.

EXAMPLE 3

Six grams of a copolymer prepared from 140 parts vinylidene fluoride, 35 parts tetrafluoroethylene, and 1 part t-butyl methacrylate were dissolved in 50 ml. of N,N-dimethylformamide. To 12.5 ml. of this solution was added 1.5 g. of zinc dust. This mixture was well stirred and was then coated onto a Bonderite 1000 steel panel (phosphate conversion coating). After evaporation of the solvent the panel was heated in an oven at 120 to 130° C. for 30 minutes and then was heated further for 1 minute on a hot plate at 190 to 200° C. The coating was 2.2 mils thick and contained 20% zinc by volume. No coating failure occurred on bending the panel 90 degrees. After exposure to the weather for 31 months, only slight rusting had taken place and this was at the bare steel edges of the panel. The back of the panel which was uncoated was deeply pitted by rust. A similar steel panel coated with the copolymer alone exhibited considerable under-rusting after only three months exposure to the weather.

EXAMPLE 4

To 12.5 ml. of a methyl ethyl ketone solution of 1.5 g. of a copolymer prepared from 140 parts vinylidene fluoride, 35 parts tetrafluoroethylene, 30 parts vinyl acetate and 2 parts methacrylic acid was added 1.5 g. powdered zinc metal. The mixture was well stirred to disperse the zinc and then coated onto a 4 x 6 inch Bonderite 1000 steel (phosphate conversion coating) panel. The solvent was evaporated at room temperature to give a hard, tough, gray coating, approximately 2.5 mils in thickness and containing 20% by volume of zinc. After exposure of a section of this panel to the weather in the atmosphere of a chemical plant for one year, no underfilm rusting or change in coating appearance was noted. In contrast, a similar uncoated steel panel was deeply pitted by rust over its entire surface and even a steel panel coated with the clear fluorocarbon copolymer showed considerable under-rusting. Similar good protection from corrosion was achieved with the same coating composition containing 48% by volume of zinc.

EXAMPLE 5

The procedure of Example 4 was followed using 1.2 g. of zinc dust mixed into 5 ml. of a solution prepared from 100 ml. of methyl ethyl ketone and 12 g. of a polymer of 140 parts vinylidene fluoride, 20 parts tetrafluoroethylene, 20 parts hexafluoropropylene, 5 parts of vinyl butyrate and 2 parts of methacrylic acid. The mixture was coated onto a 3 x 6 inch, freshly sandblasted panel of 20 gauge automotive steel and the solvent was allowed to evaporate at room temperature. The dried coating contained 32 volume percent zinc. On a 2 x 4 inch section of the coated panel, a portion of the coating was cut through to bare metal in a grid pattern and then the panel was exposed to the weather. After an exposure of 18 months, the panel showed no rusting or under-rusting on the coated face of the panel. Likewise, there was no rusting in the grid area of the panel. A similar coated panel containing 20% by volume of zinc showed only a trace of under-rusting after the same exposure.

A coating of the same polymer containing aluminum flake showed definite under-rusting after similar exposure. A coating of the same polymer pigmented with titanium dioxide and applied over a red lead-primed steel underwent extensive rusting, particularly at the edges of the panel when exposed to the same weather test.

The fluorine-containing polymer was characterized by: 61.0% fluorine; melt flow rate=106 g./10 min. at 195° C.; Tg=<0° C., and sticking temperature=67° C.

EXAMPLE 6

The fluorocarbon polymer of this example was prepared by the following continuous method. Three parts of vinyl butyrate and 0.5 part of bis(2-chloroethyl) vinylphosphonate and an initiator such as t-butyl peroxypivalate were dissolved in a reaction solvent such as glacial acetic acid. The resulting solution was pumped into an agitated pressure vessel which was liquid full of the reaction mixture at the reaction temperature. At the same time, 80 parts of gaseous vinylidene fluoride and 20 parts of gaseous tetrafluoroethylene under pressure were forced into the same liquid full pressure vessel. The reactants were admitted into the vessel in essentially the same ratio as desired in the product. The pressure within the vessel was maintained at or above autogenous pressure by a pressure release valve in the exit line which opens when its release pressure was reached. Thus, reactants were continuously pumped into the vessel and product continuously discharged from the system through the pressure release valve. The copolymer product was isolated by addition to alcohol or other solvent to completely precipitate the copolymer which was then filtered and reslurried with more alcohol. The solid copolymer isolated by filtration was dried overnight. The solid copolymer was analyzed and found to have a fluorine content of 55% by weight, a sticking temperature of 67° C., a glass transition temperature (Tg) of 40° C. and a melt flow rate of 12.6 g./10 minutes at 195° C.

Twenty-five parts by weight of the above vinylidene fluoride/tetrafluoroethylene/vinyl butyrate/bis(2 - choroethyl vinylphosphonate copolymer were dissolved in 76 parts by weight of cyclohexanone. From this solution the following primer mixtures were prepared:

I. Ten parts of fluorocarbon polymer solution and eight parts of pigment grade zinc dust.
II. Ten parts of fluorocarbon polymer solution and three parts of lead silicochromate pigment.

Mixture II was pebble milled for seven days. Mixture I gave good uniform mixture by simple mechanical stirring. Each mixture was then used to coat panels of freshly sandblasted 20 gauge automotive steel. The coatings were brush applied. The coatings were air dried for one day. Air-dried coating I contained approximately 40 volume percent zinc. On each panel the primer coats were 1 mil thick.

A paint or topcoat was also prepared from the above fluorocarbon copolymer using the following formulation:

| | | |
|---|---|---|
| Fluorocarbon copolymer | g | 25 |
| Solvent (cyclohexanone) | ml | 80 |
| Titanium dioxide pigment | g | 12.5 |
| Lampblack (pigment grade) | g | 0.5 |
| "Monastral" Green B pigment, Color Index No. 10006 | g | 2.0 |

The fluorocarbon polymer was dissolved in the solvent with heating whenever necessary to facilitate solution. The pigment mixture was placed in a pebble mill and the fluorocarbon polymer solution was added. The slurry was ground for seven days to achieve complete dispersion.

To each of the air-dried primer coatings was then applied by brush a coating of this fluorocarbon copolymer pigmented topcoat formulation. The topcoated panels were air dried at room tepmerature for two weeks. The topcoats were each about one mil in thickness. Additional panels were prepared in the same manner in which the topcoat formulation was altered by replacement of the lampblack and green pigments with a corresponding quantity of the titanium dioxide pigment to give a white topcoat formulation. Each primer coat and each topcoat were applied to both flat sides of each steel panel. Each air-dried panel was cut into two approximately equal portions and the edges were trimmed to give at least two bare steel edges on each piece. One panel section corresponding to each coating combination was tested as follows: First, an X cut to the bare metal was made through both coatings on one flat side of the panel. After the X cut was made, the panel was turned over and subjected to a 160 inch/pound impact test with round-nose steel impact rod (Gardner Impact Tester) at the point where the X cut intersects on the reverse side of the panel. After the impact, a piece of adhesive tape was pressed directly over the X cut and ripped away to test adhesion.

The second of each coated panel section was tested as follows: First, an X cut through to bare metal was made on one flat side of the panel. Then, the piece was immersed in 5% aqueous sodium chloride solution which was continuously aerated. After fourteen days the piece was removed and inspected. The coating was then tested for adhesion with the adhesive tap test described above. Thereafter, the piece was subjected to the 160 inch/pound impact test at a point opposite the X cut as described above. The adhesive tape test for adhesion was repeated over the X cut.

Similar panels coated only with the primer were prepared and tested by exactly the same procedures described above. Each sample was given a single rating based on the over-all results of this testing program. The ratings were the same as those set forth in Example 1. The results are set forth in Table V below.

TABLE V

| Primer Composition | With Topcoat | Without Topcoat |
|---|---|---|
| I (Zinc) | G; no change | F; surface discolored. |
| II (Lead silicochromate.) | P; severe corrosion at X cut and at bare edges. | P; severe corrosion at X cut and at bare edges. |

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. A corrosion-resistant coating composition for ferrous metals comprising from about 20% to 90% by volume of finely divided zinc metal dispersed in a fluorocarbon polymer, said polymer being characterized by having a fluorine content of at least 30% by weight, a sticking temperature greater than 60° C., a glass transition temperature of less than 105° C., and a melt flow rate of greater than 0.5 g./10 minutes at 195° C.

2. A corrosion-resistant coating composition for ferrous metals comprising from about 20% to 90% by volume of finely divided zinc metal dispersed in a normally solid copolymer having units derived from at least one terminally unsaturated fluoroolefin and at least one polymerizable monomer selected from the group consisting of
   (A) the ethylenically unsaturated mono- and dicarboxylic acids of from three to eleven carbon atoms,
   (B) the lower alkyl mono- and diesters, the salts, and the anhydrides of said carboxylic acids,
   (C) the ethylenically unsaturated phosphonic acids having up to eighteen carbon atoms, and
   (D) the lower alkyl mono- and diesters, the salts, and the anhydrides of such phosphonic acids, said polymer being characterized by having a fluorine content of at least 30% by weight, a sticking temperature greater than 60° C., a glass transition temperature of less than 105° C., and a melt flow rate of greater than 0.5 g./10 minutes at 195° C.

3. The corrosion-resistant coating composition of claim 1 wherein the fluorocarbon polymer is polyvinylidene fluoride.

4. The corrosion resistant coating composition of claim 1 wherein the fluorocarbon polymer is a copolymer comprising vinylidene fluoride and tetrafluoroethylene.

5. The corrosion-resistant coating composition of claim 1 wherein the fluorocarbon polymer is a copolymer comprising vinylidene fluoride, tetrafluoroethylene and vinyl butyrate.

6. The corrosion-resistant coating composition of claim 1 wherein the fluorocarbon polymer is a copolymer of vinylidene fluoride, tetrafluoroethylene, vinyl butyrate and bis(2-chloroethyl) vinylphosphonate.

7. An article of manufacture comprising a ferrous metal substrate and adhered thereto over at least a portion of said substrate a coating layer of the corrosion-resistant coating composition of claim 1.

8. An article of manufacture comprising a ferrous metal substrate and adhered thereto over at least a portion of said substrate a coating layer of the corrosion-resistant coating composition of claim 1 and overlaid and adhered to said corrosion-resistant coating a zinc-free fluorocarbon polymer topcoating composition, said polymer being characterized by having a fluorine content of at least 30% by weight, a sticking temperature greater than 60° C., a glass transition temperature of less than 105° C., and a melt flow rate of greater than 0.5 g./10 minutes at 195° C.

9. An article of manufacture of claim 8 wherein the fluorocarbon polymer topcoating composition is pigmented.

10. An article of manufacture comprising a ferrous metal substrate and adhered thereto over at least a portion of said substrate a layer of a corrosion-resistant coating comprising from about 20% to 90% by volume of finely divided zinc metal dispersed in a pigmented fluorocarbon polymer, said polymer being characterized by having a fluorine content of at least 30% by weight, a sticking temperature greater than 60° C., a glass transition temperature of less than 105° C., and a melt flow rate of greater than 0.5 g./10 minutes at 195° C.

References Cited

UNITED STATES PATENTS

| 2,419,009 | 4/1947 | Coffman et al. | 260—87.5 |
| 2,462,763 | 2/1949 | Nightingall | 117—160 X |
| 2,468,054 | 4/1962 | Ford | 260—87.7 |
| 3,019,206 | 1/1962 | Robb | 260—41 X |
| 3,105,056 | 9/1963 | Oshima et al. | 260—41 X |
| 3,111,426 | 11/1963 | Capron et al. | 117—75 |
| 3,277,419 | 12/1966 | Butz | 117—72 |

WILLIAM D. MARTIN, *Primary Examiner.*

R. HUSACK, *Assistant Examiner.*